(12) United States Patent
Vaarno

(10) Patent No.: US 8,813,977 B2
(45) Date of Patent: Aug. 26, 2014

(54) METHOD FOR FABRICATING DISCHARGE END CHUTE ARRANGEMENT OF A LIQUID-LIQUID EXTRACTION SETTLING TANK AND SAID CHUTE ARRANGEMENT

(75) Inventor: Jussi Vaarno, Kirkkonumi (FI)

(73) Assignee: Outotec Oyj, Espoo (FI)

( * ) Notice: Subject to any disclaimer, the term of this patent is extended or adjusted under 35 U.S.C. 154(b) by 402 days.

(21) Appl. No.: 13/201,855

(22) PCT Filed: Feb. 25, 2010

(86) PCT No.: PCT/FI2010/050141
§ 371 (c)(1),
(2), (4) Date: Aug. 16, 2011

(87) PCT Pub. No.: WO2010/097516
PCT Pub. Date: Sep. 2, 2010

(65) Prior Publication Data
US 2011/0297606 A1      Dec. 8, 2011

(30) Foreign Application Priority Data

Feb. 26, 2009   (FI) ...................................... 20095185

(51) Int. Cl.
| | | |
|---|---|---|
| *B01D 11/04* | (2006.01) | |
| *B01D 21/24* | (2006.01) | |
| *F16L 55/07* | (2006.01) | |
| *F16L 9/12* | (2006.01) | |
| *B29C 53/66* | (2006.01) | |

(52) U.S. Cl.
CPC ............. *B01D 11/0449* (2013.01); *B29C 53/66* (2013.01)
USPC ...................................................... 210/521

(58) Field of Classification Search
CPC ........ B29C 53/40; B29C 53/42; B29C 53/44; B29C 53/66; B29C 53/56; B01D 11/04; B01D 11/0449; B01D 11/0453; B01D 21/24; B01D 21/2444; B01D 21/0087; F16L 55/07; F16L 55/10; F16L 55/105; F16L 9/12; F16L 9/128
USPC ............. 210/86, 97, 232, 511, 519, 521, 522, 210/532.1, 538, 540; 242/360, 430; 422/256–259; 156/169–175, 425–433, 156/158; 138/37, 39, 92, 94, 155, 172
See application file for complete search history.

(56) References Cited

U.S. PATENT DOCUMENTS 3,437,212 A * 4/1969 Lemberg et al. ............... 210/525
3,742,985 A * 7/1973 Rubenstein .................... 138/141
(Continued)

FOREIGN PATENT DOCUMENTS

| CN | 1216932 A | 5/1999 |
|---|---|---|
| CN | 1216933 A | 5/1999 |

(Continued)

OTHER PUBLICATIONS

Ari Hirvonen, International Search Report for PCT/FI2010/050141.
(Continued)

*Primary Examiner* — Joseph Drodge
(74) *Attorney, Agent, or Firm* — Chernoff Vilhauer McClung & Stenzel LLP

(57) ABSTRACT

The subject of the invention is a method for fabricating the discharge end (2) chute arrangement (3) of a liquid-liquid extraction settling tank and the corresponding chute arrangement. The chute arrangement (3) comprises at least one chute member (4, 5; 6), which is made of fiber-reinforced plastic composite. The chute member (4, 5; 6) is manufactured by the filament winding technique essentially making a tubular hollow piece.

16 Claims, 3 Drawing Sheets

(56) References Cited

U.S. PATENT DOCUMENTS

Figure 1:
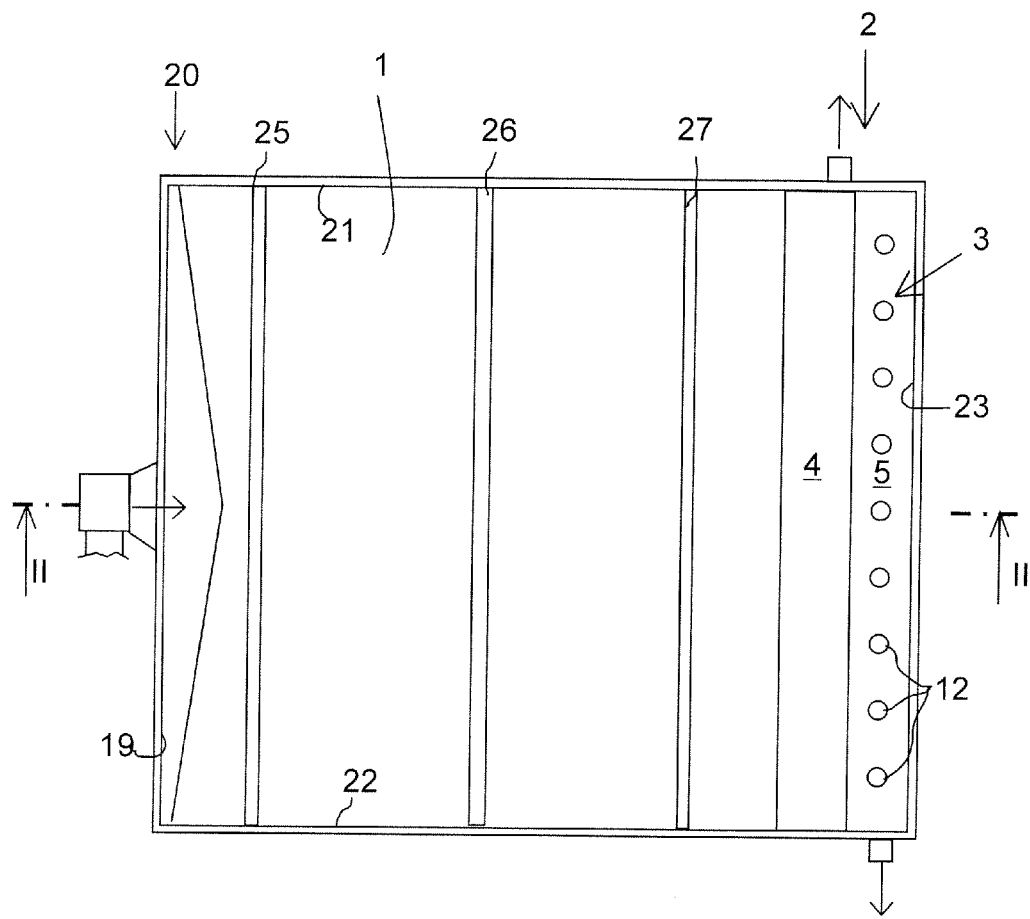

| | | | |
|---|---|---|---|
| 3,984,271 A | | 10/1976 | Gilbu |
| 5,213,379 A | * | 5/1993 | Taniguchi et al. ............ 285/390 |
| 5,213,547 A | * | 5/1993 | Lochtefeld .................... 472/117 |
| 5,458,746 A | * | 10/1995 | Burgess et al. ................. 205/77 |
| 5,480,566 A | * | 1/1996 | Strand ........................... 210/772 |
| 6,083,400 A | * | 7/2000 | Nyman et al. ................. 210/634 |
| 6,132,615 A | * | 10/2000 | Nyman et al. ................. 210/634 |
| 6,267,900 B1 | * | 7/2001 | Nyman et al. ................. 210/800 |
| 6,306,320 B1 | * | 10/2001 | Flautt et al. ................... 264/45.3 |
| 6,569,339 B1 | * | 5/2003 | Laitala et al. ................. 210/634 |
| 6,736,168 B2 | * | 5/2004 | Amano et al. ................. 138/129 |
| 7,854,662 B2 | * | 12/2010 | Braun et al. ................... 472/117 |
| 2003/0151171 A1 | | 8/2003 | LeBreton et al. |
| 2004/0222149 A1 | * | 11/2004 | Abrams ........................ 210/519 |
| 2005/0218072 A1 | | 10/2005 | San Lorenzo |
| 2006/0165569 A1 | | 7/2006 | Giralico et al. |
| 2007/0221587 A1 | * | 9/2007 | Tuomikoski .................. 210/800 |

FOREIGN PATENT DOCUMENTS

| | | |
|---|---|---|
| CN | 1216934 A | 5/1999 |
| CN | 1652855 A | 8/2005 |
| CN | 201082367 Y | 7/2008 |
| DE | 3231164 A1 | 2/1984 |
| WO | 97/40899 A1 | 11/1997 |
| WO | 97/40900 A1 | 11/1997 |
| WO | 97/40901 A1 | 11/1997 |
| WO | 03/097207 A1 | 11/2003 |
| WO | 2007135221 A1 | 11/2007 |
| WO | 2009063128 A1 | 5/2009 |

OTHER PUBLICATIONS

Chinese Search Report for Patent Application No. 201080009661.0, dated May 30, 2013, 2 pages.

European Search Report dated Dec. 20, 2013, European App. No. 10745862.2, Outotec Oyj, 7 pgs.

* cited by examiner

METHOD FOR FABRICATING DISCHARGE END CHUTE ARRANGEMENT OF A LIQUID-LIQUID EXTRACTION SETTLING TANK AND SAID CHUTE ARRANGEMENT

FIELD OF THE INVENTION

The object of the invention is the method specified in the preamble to claim 1. A further object of the invention is the chute arrangement specified in the preamble to claim 4.

BACKGROUND OF THE INVENTION

The manufacture of discharge end chute members for liquid-liquid extraction settlers from fibre-reinforced plastic composite is known in the prior art where manufacture occurs by hand lamination. In a known chute arrangement there is normally two chutes side by side that are open at the top, one of which serves as an overflow chute, whereby the lighter solution phase can enter the chute over the overflow edge. The other chute collects the heavier solution phase exiting via rise apertures in the bottom of the chute as an underflow.

The problem is that the manufacture of chutes by hand laminating is very laborious, time-consuming and expensive. A further problem is the fact that in a chute arrangement where the chutes are open at the top, reinforcement and support structures are required to stiffen and support the chutes. Additionally, scaffolding has had to be built on top of the chutes as an access platform.

A further difficulty is that an overflow into an open chute causes mist emissions, which spread into the surrounding atmosphere, degrading working conditions. Furthermore, the phase overflowing into the open chute is exposed to oxidation, which increases solution costs.

PURPOSE OF THE INVENTION

The purpose of the invention is to remove the above-mentioned drawbacks.

In particular, one purpose of the invention is to present a method and chute arrangement that enable the automated manufacture of chute members and the reduction of manufacturing costs.

A further purpose of the invention is to introduce a method and chute arrangement, thanks to which the chute arrangement can be made sufficiently rigid and robust without extra supports and reinforcements.

In addition, one purpose of the invention is to introduce a method and chute arrangement, which make it possible that separate access platform structures are not required.

Additionally, one purpose of the invention is to introduce a chute arrangement, which prevents mist emissions from entering the atmosphere of the settler space from the chute member, thus improving working conditions.

Furthermore, one purpose of the invention is to introduce a chute arrangement, which decreases the oxidation degree of the phase overflowing into the chute member.

A further purpose of the invention is to reduce the delivery time, transfer, assembly, and installation costs of the chute arrangement, to improve quality, to reduce maintenance and solution costs as well as improving working conditions.

SUMMARY OF THE INVENTION

The characteristic features of the method accordant with the invention are those presented in claim 1. The further characteristic features of the chute arrangement accordant with the method are those presented in claim 4.

In the method accordant with the invention, the chute member is manufactured by the filament winding technique into an essentially tubular hollow piece.

Correspondingly, in the chute arrangement accordant with the invention, the chute member is manufactured by the filament winding technique into an essentially tubular hollow piece.

The benefit of the invention is that the filament winding technique is an automated manufacturing method, which significantly reduces the required man-hours and manufacturing costs, shortens the delivery time and improves quality. When the chute member is a tubular hollow piece, it is intrinsically sufficiently strong and rigid that additional reinforcement and other support structures are not required. As an essentially closed structure, the inner atmosphere of the chute can be isolated from the atmosphere of the settler space so that mist emissions cannot escape from the interior of the chute member into the settler space to contaminate the air and worsen the working conditions. In addition, when the lighter solution phase is an organic phase, the oxidation degree of the overflowing organic phase decreases, whereby solution costs are reduced. Additionally, one advantage of the invention is that it is possible to walk on top of the tubular covered structure of the chute member, so that no separate access platform structures are required.

In one embodiment of the method, at least one essentially flat section is formed in the chute member housing, and the chute member is installed so that the flat section is horizontal in the upper part of the chute arrangement for use as an access platform.

In one embodiment of the method, a set of chute elements are manufactured by the filament winding technique and the chute elements are laid end to end at the installation site and attached to each other with pipe joints to form a chute member of suitable length. This kind of modular structure allows smaller transfer, assembly, and installation costs than before.

In one embodiment of the chute arrangement, there is at least one essentially flat section in the chute member housing to form an access platform.

In one embodiment of the chute arrangement, the curvature direction of the frame in the cross section of the chute member housing is invariable. The frame of the housing can include only convex areas but not concave areas at all so that filament winding onto a revolving mandrel would succeed.

In one embodiment of the chute arrangement, in cross-section the chute member is a polygon with convex sides and rounded corners.

In one embodiment of the chute arrangement, the chute member consists of a set of chute elements, which are fixed to each other end to end with pipe joints.

In one embodiment of the chute arrangement, the chute arrangement is made up of two chute members arranged side by side, the first chute member and the second chute member.

In one embodiment of the chute arrangement, the first chute member and the second chute member are similar in the shape of their cross-section.

In one embodiment of the chute arrangement, there is a row of elongated overflow apertures in the upper section of the housing of the first chute member along the length of the chute member, through which apertures the lighter solution phase can exit the settler as overflow into the interior of the first chute member for the further removal thereof.

In one embodiment of the chute arrangement, there is a row of rise apertures in the bottom section of the housing of the second chute member along the length of the chute member, into each of which a level control valve is arranged and through which said rise apertures the heavier solution phase is able to rise into the inside of the second chute member for the further removal thereof.

One embodiment of the chute arrangement includes a chute member, which is divided into at least two compartments tightly insulated from each other by a partition wall placed inside the chute member along its length, making a first compartment and a second compartment.

In one embodiment of the chute arrangement, a row of elongated overflow apertures are arranged along the length of the chute member in the upper section of the housing of the chute member in the first compartment side, via which the lighter solution phase can exit the settler as overflow into the first compartment for the further removal thereof.

In one embodiment of the chute arrangement, a row of rise apertures are arranged along the length of the chute member in the bottom section of the housing of the chute member in the second compartment side, and into each aperture a level control valve is arranged through which said rise apertures the heavier solution phase can rise into the inside of the second compartment for the further removal thereof.

In one embodiment of the chute arrangement, the overflow apertures are arranged so that the surface level of the lighter solution phase remains above the overflow apertures in the settler. The localised pressure drop of the apertures can be dimensioned so that the surface level of the organic liquid remains above the apertures. This isolates the chute atmosphere from the rest of the settler, preventing mist emissions of the organic from escaping into the settler space. Furthermore, the oxidation degree of the organic phase is decreased, because evaporation in the pipe reduces the partial pressure of oxygen.

In one embodiment of the chute arrangement, guide pipes are arranged inside the chute member, where the upper end of each pipe opens into an overflow aperture to receive the lighter solution phase exiting the settler as overflow and where the lower end of each guide pipe opens out below the surface level of the solution phase inside the chute member. The oxidation caused by the free fall of the organic liquid can be completely prevented by routing the liquid exiting the apertures by means of pipes submerged below the surface of the liquid in the chute.

LIST OF DRAWINGS

Figure 2:
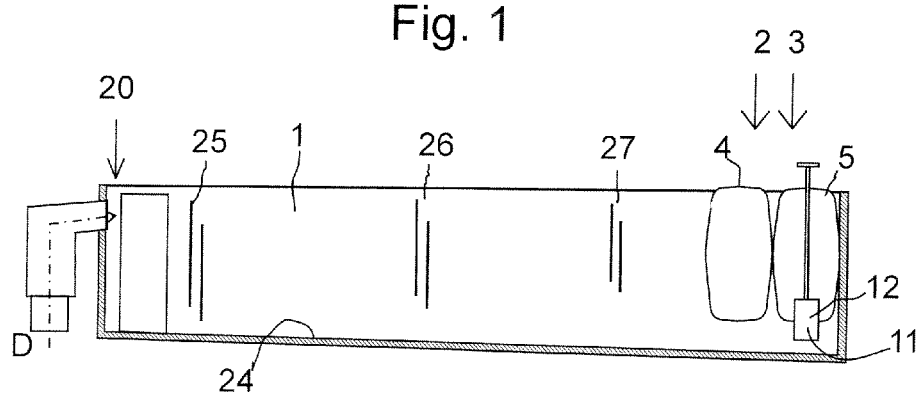
Figure 3:
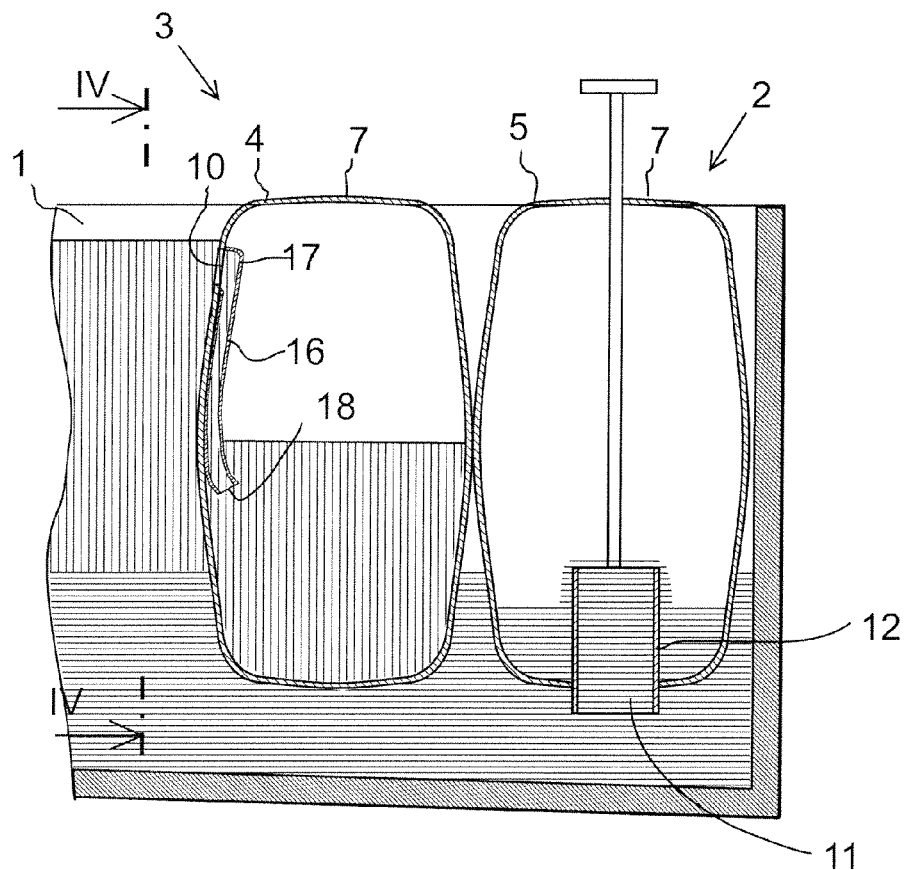
Figure 4:
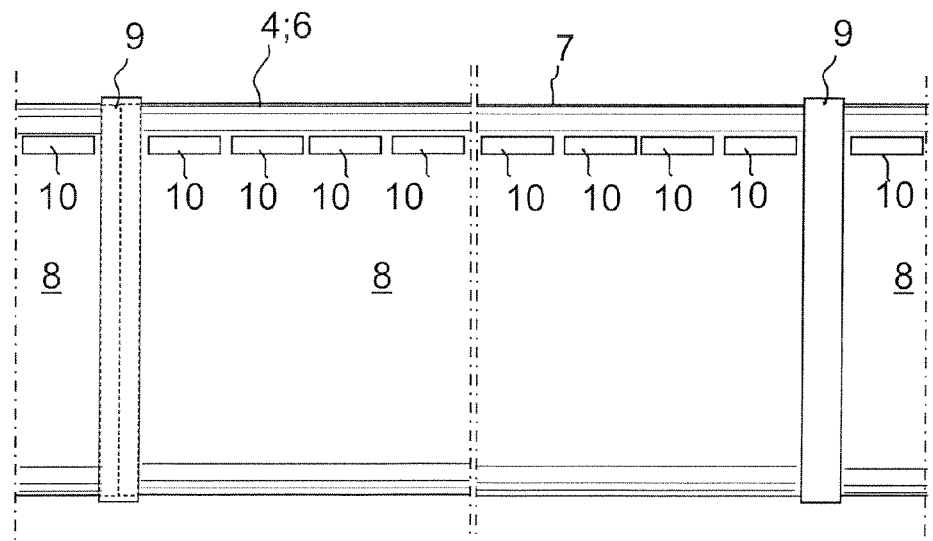
Figure 5:
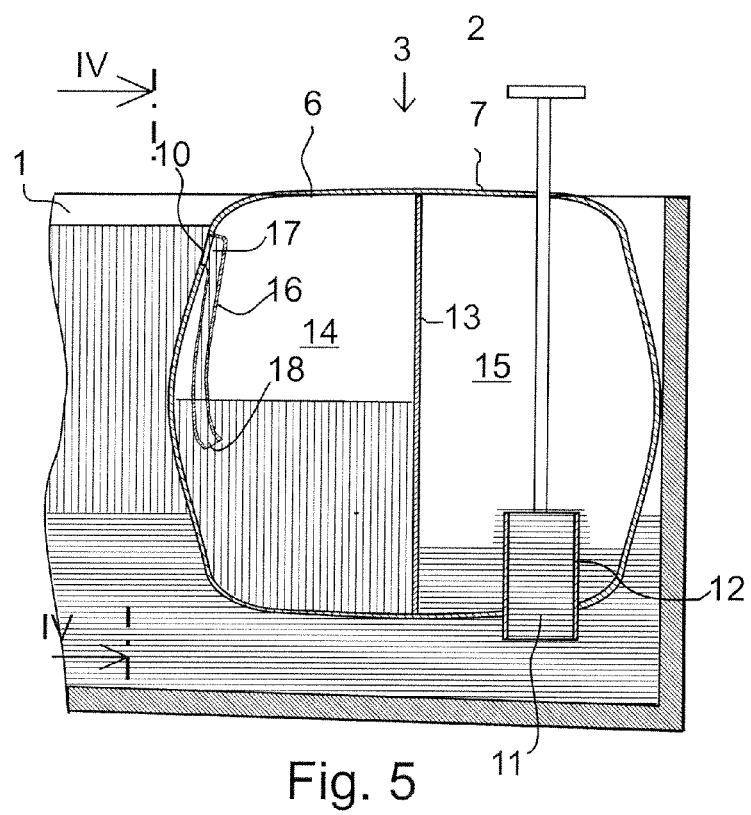
Figures 6, 7:
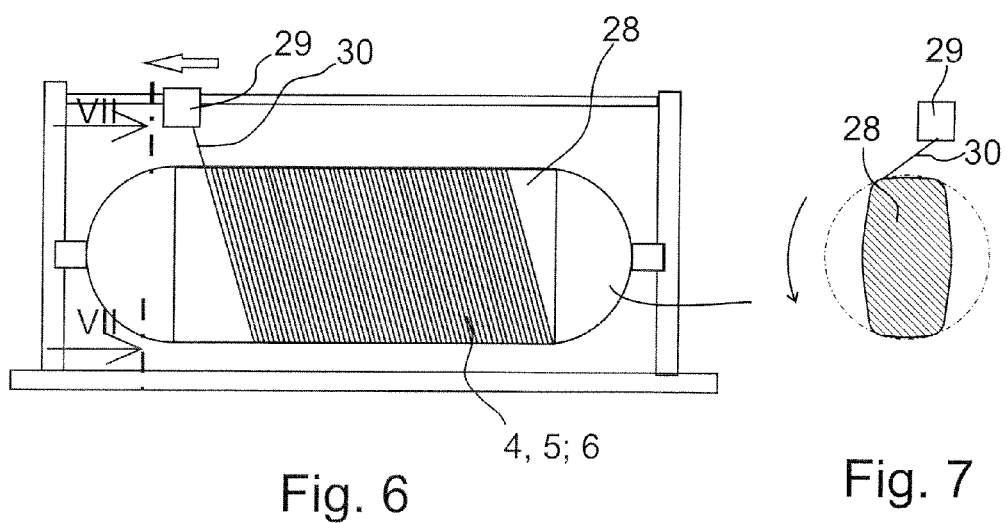

The invention is described below in detail by means of example embodiments with reference to the appended drawings, in which FIG. 1 is a diagrammatic representation of a liquid-liquid extraction tank seen from above, where the first embodiment of the chute arrangement accordant with the invention has been installed at the discharge end, FIG. 2 presents the section II-II from FIG. 1, FIG. 3 presents a cross-section of the first embodiment of the chute arrangement at the discharge end of the liquid-liquid extraction tank, FIG. 4 presents the section IV-IV from FIGS. 3 and 5, FIG. 5 presents a cross-section of another embodiment of the chute arrangement at the discharge end of the liquid-liquid extraction tank, FIG. 6 is a diagrammatic representation of the manufacturing of a chute member accordant with the invention by filament winding, and FIG. 7 presents section VII-VII from FIG. 6.

DETAILED DESCRIPTION OF THE INVENTION

FIGS. 1 and 2 present a liquid-liquid extraction separation tank 1, which is equipped with a chute arrangement 3. The tank 1 comprises an end wall 19 in the feed end 20 of the tank, sidewalls 21, 22, a discharge end 2 end wall 23 and a bottom 24, which delimit the liquid-liquid extraction separation space (known as the settler) within them.

In the mixing space (not shown), the prepared dispersion is fed into the tank 1 at the feed end 20. The first and second solutions separated into overlapping phases are arranged so as to be removed when separated from each other at the discharge end 2, opposite the feed end 20. Revert members 25, 26, 27 are arranged in the tank between the feed end and the discharge end to form consecutive separation sections in the direction of flow to separate gradually the lighter first solution as the upper solution phase and to separate the heavier second solution as the lower solution phase. The first discharge chute 4 is in the discharge end 2, which is crosswise to the direction of flow and receives the overflow from the tank 1 of the first solution separated into the upper phase, and from which first chute member 4 the solution phase is removed. In the direction of flow after the first chute member 4 and adjacent to it there is provided a second chute member 5 to receive the second solution as underflow from the tank 1. On the bottom of the second chute member 5 there are rise apertures 11, which are equipped with level control valves 12 and through which the second solution phase can rise into the second chute member, from which the second solution phase is further removed. The surface level of the second solution phase in the tank 1 can be regulated with the level control valves 12.

FIG. 3 presents a close-up of the chute arrangement 3 in the discharge end 2 of the tank 1 from FIG. 2 as a cross-section.

As FIG. 3 also shows, this embodiment consists of two chute members arranged side by side, the first chute member 4 and the second chute member 5. Both chute members 4 and 5 are manufactured by the filament winding technique into essentially tubular hollow pieces. Thanks to its tubular shell construction, the structure of the chute members 4 and 5 has very good flexural and torsional rigidity. The first chute member 4 and the second chute member 5 are similar in the shape of their cross-section, so they can be manufactured on the same mandrel 28. The cross-section shape of the chute members 4, 5 is basically a rectangle with rounded corners and long sides bending with large radius. Thanks to the rectangular shape, there is a flat section 7 in the housing of the chute member 4, 5, and this can act as an access platform on which it is possible to walk.

The preferred modular structure of the chute members 4, 5 is illustrated in FIG. 4. It consists of a set of chute elements 8, which are manufactured by the filament winding technique into 5- to 10-meter-long lengths and are fixed to each other end to end with pipe joints 9, sleeve couplings as in the drawing or flange joints (not shown), to form a chute of suitable length to extend across the interior of the tank 1.

FIGS. 3 and 4 show that there is a row of elongated overflow apertures 10 in the upper section of the housing of the first chute member 4 along the length of the chute member, through which the lighter solution phase can exit the tank 1 as overflow into the inside of the first chute member 4 for the further removal thereof. The overflow apertures 10 are arranged so that the surface level of the lighter solution phase remains above the overflow apertures in the tank 1. Inside the chute member 4 there are arranged guide pipes 16, where the upper end 17 of each pipe opens into an overflow aperture 10 to receive the lighter solution phase exiting the tank as overflow and where the lower end 18 of each guide pipe opens out below the surface level of the solution phase inside the chute member.

With further reference to FIG. 3, there is a row of rise apertures 11 in the bottom section of the housing of the second chute member 5 along the length of the chute member, into each of which a level control valve 12 is arranged. The heavier solution phase is allowed to rise via the rise apertures 11 to the interior of the second chute member 5 for further removal thereof.

FIG. 5 is an embodiment of the chute arrangement 3, in which one chute member 6 formed into a tubular hollow piece by the filament winding technique is divided by a vertical partition wall 13 set longitudinally inside the chute member into two compartments tightly separated from each other, the first compartment 14 and the second compartment 15.

FIG. 4 also presents a section of FIG. 5 and this shows that there is a row of elongated overflow apertures 10 in the upper section of the housing of the chute member 6 along the length of the chute member in the first compartment 14, through which the lighter solution phase can exit the tank 1 as overflow into the inside of the first compartment 14 for the further removal thereof. The overflow apertures 10 are arranged so that the surface level of the lighter solution phase remains above the overflow apertures in the tank 1. Also in this embodiment, guide pipes 16 are arranged inside the chute member 6, where the upper end 17 of each pipe opens into an overflow aperture 10 to receive the lighter solution phase exiting the tank as overflow into the first compartment 14. The lower end 18 of each guide pipe opens out below the surface level of the solution phase inside the chute member.

A row of rise apertures 11 is arranged along the length of the chute member in the bottom section of the housing of chute member 6 in the second compartment 15. A level control valve 12 is arranged in each rise aperture 11. The heavier solution phase is able to rise via the rise apertures 11 into the inside of the second compartment 15 for the further removal thereof.

The manufacture of chute member 4, 5 or 6 by the filament winding technique is depicted in FIGS. 6 and 7. The filament-winding equipment includes a rotatable mandrel 28, the external form of which corresponds to the form of the finished chute member—hollow piece. The equipment has a moving fibre delivery head 29, which leads the fibre 30 moistened with thermoset plastic around the rotating mandrel 28 in the desired form and thickness with a suitable number of layers. The thermoset plastic may be for instance epoxy resin, polyester resin, vinyl ester resin or phenolic resin. The fibre may be glass fibre or carbon fibre and it may be chopped fibre, roving fibre, weave or mat in structure. When the desired thickness of the chute member housing has been achieved, the mandrel 28 with the chute member housing is transferred by a normal method into an oven (not shown in the drawings) to harden the resin. When the resin has hardened, the mandrel is removed.

The invention is not restricted to the example embodiments presented above, but many other variations are possible without departing from the spirit of the invention as defined in the claims.

The invention claimed is:

1. A method for fabricating a liquid-liquid extraction settler discharge end chute arrangement, where said chute arrangement comprises at least one chute member which is made of fibre-reinforced plastic composite, characterized in that the chute member is manufactured into an essentially tubular hollow piece by winding filament around a rotating mandrel, where the chute member has a substantially rectangular cross section in the upper section of the of the chute member, where at least one essentially flat part is formed on an outer surface of the chute member, and the chute member is installed so that the flat part is upwards and essentially horizontal in the upper section of the chute arrangement for use as an access platform.

2. A method according to claim 1, characterized in that a set of chute elements are manufactured with filament winding technology, and that at the installation site the chute elements are placed end to end and are attached to each other with a pipe joint to form a chute member of suitable length.

3. A chute arrangement for the discharge end of a liquid-liquid extraction settler, where said chute arrangement comprises at least one chute member, which is manufactured of fibre-reinforced plastic composite, and where the chute member is to be installed crosswise in the settler discharge end, characterized in that the chute member is manufactured into an essentially tubular hollow piece by winding filament around a rotating mandrel, where the chute member housing has an upper section with a substantially rectangular cross section and that forms an essentially flat access platform section upon which it is possible to walk.

4. A chute arrangement according to claim 3, characterized in that the curvature direction in the cross section of the chute member is invariable.

5. A chute arrangement according to claim 3, characterized in that the chute member is a polygon in cross-section, with convex sides and rounded corners.

6. A chute arrangement according to claim 3, characterized in that the chute member consists of a set of chute elements (8), which are fixed to each other end to end with pipe joints.

7. A chute arrangement according to claim 3, characterized in that the chute arrangement is made up of two chute members arranged side by side, the first chute member and the second chute member.

8. A chute arrangement according to claim 7, characterized in that the first chute member and the second chute member are similar in the shape of their cross-section.

9. A chute arrangement according to claim 7, characterized in that there is a row of overflow apertures along the length of the chute member in the upper section of the first chute member, through which a lighter solution phase may exit the settler as overflow into the interior of the first chute member for the further removal thereof.

10. A chute arrangement according to claim 9, characterized in that the overflow apertures are arranged so that the surface level of the lighter solution phase remains above the overflow apertures in the settler.

11. A chute arrangement according to claim 8, characterized in that guide pipes are arranged inside the chute member where the upper end of each pipe opens into an overflow aperture to receive a lighter solution phase exiting the settler as overflow and where the lower end of each guide pipe opens out below the surface level of the solution phase inside the chute member.

12. A chute arrangement for the discharge end of a liquid-liquid extraction settler, where said chute arrangement comprises at least one chute member manufactured of fibre-reinforced plastic composite, and where the chute member is to be installed crosswise in the settler discharge end, characterized in that the chute member is manufactured into an essentially tubular hollow piece by winding filament around a rotating mandrel, where there is a row of rise apertures along the length of the chute member in the bottom section of second chute member, into each of which a level control valve is arranged and through which said rise apertures a heavier solution phase is able to rise into the inside of the second chute member for the further removal thereof.

13. A chute arrangement for the discharge end of a liquid-liquid extraction settler, where said chute arrangement comprises at least one chute member manufactured of fibre-reinforced plastic composite, and where the chute member is to be installed crosswise in the settler discharge end, characterized in that the chute member is manufactured into an essentially tubular hollow piece by winding filament around a rotating mandrel, where the chute arrangement includes a chute member, which is divided into at least two compartments tightly insulated from each other by a partition wall placed inside the chute member along its length.

14. A chute arrangement according to claim 13, characterized in that a row of elongated overflow apertures are arranged along the length of the chute member in the upper section of the chute member in a first compartment, via which a lighter solution phase can exit the settler as overflow into the first compartment for the further removal thereof.

15. A chute arrangement according to claim 13, characterized in that a row of rise apertures are arranged along the length of the chute member in the bottom section of the chute member in a second compartment, into each of which said apertures a level control valve is arranged and through which rise apertures a heavier solution phase can rise into the inside of the second compartment for the further removal thereof.

16. A chute arrangement for the discharge end of a liquid-liquid extraction settler, where said chute arrangement comprises at least one chute member manufactured of fibre-reinforced plastic composite, and where the chute member is to be installed crosswise in the settler discharge end, characterized in that the chute member is manufactured into an essentially tubular hollow piece by winding filament around a rotating mandrel, where guide pipes are arranged inside the chute member, where the upper end of each pipe opens into an overflow aperture to receive a lighter solution phase exiting the settler as overflow and where the lower end of each guide pipe opens out below the surface level of the solution phase inside the chute member.

\* \* \* \* \*